United States Patent [19]

Boonchanta et al.

[11] Patent Number: 4,491,207
[45] Date of Patent: Jan. 1, 1985

[54] FLUID CONTROL MEANS FOR VEHICLE SUSPENSION SYSTEM

[75] Inventors: Pipon Boonchanta, Bangkok, Thailand; Edward J. Krasnicki Skaneateles, N.Y.

[73] Assignee: Lord Corporation, Erie, Pa.

[21] Appl. No.: 514,298

[22] Filed: Jul. 15, 1983

[51] Int. Cl.³ .............................................. F16F 9/50
[52] U.S. Cl. .................. 188/299; 188/322.13
[58] Field of Search .............. 188/267, 282, 285, 288, 188/299, 322.13; 280/707

[56] References Cited

U.S. PATENT DOCUMENTS 3,039,566  6/1962  Rumsey ............................... 188/299

FOREIGN PATENT DOCUMENTS 664770  1/1952  United Kingdom ................. 188/299

Primary Examiner—Duane A. Reger
Attorney, Agent, or Firm—Joseph H. Heard

[57] ABSTRACT

The fluid flow of the passive hydraulic damper is regulated by a command responsive valve so as to in effect disable the damper at those times when it would amplify rather than attenuate movement of the vehicle component whose motion is to be minimized. The command responsive valve, along with all other valves of the system, preferably is carried and protected by an accumulator which receives hydraulic fluid from the damper during both extension and retraction thereof. The control valve is of an improved voice-coil type capable of exceedingly rapid response to command signals directed thereto from an electronic controller receiving input data from motion detecting sensors associated with the vehicle components interconnected by the damper.

17 Claims, 6 Drawing Figures

FLUID CONTROL MEANS FOR VEHICLE SUSPENSION SYSTEM

FIELD OF THE INVENTION

This invention relates to vehicle suspension systems of the type having at least one motion-attenuating hydraulic shock absorber or damper and an associated fluid accumulator between which hydraulic fluid is conducted during system operation. The invention more specifically relates to a system of the aforesaid type wherein superior motion attenuation is achieved by active control of the flow of hydraulic fluid from the damper to the accumulator.

BACKGROUND OF THE INVENTION

The suspension systems of automobiles, trucks, motorcycles and many other vehicles customarily have passive hydraulic "shock absorber" or damper assemblies connected in parallel with springs between the vehicle frame and axle components to minimize motion of the vehicle frames and to thereby enhance the riding comfort, stability and/or safety of the vehicles. The output forces of the passive dampers are usually entirely dependent upon the rate of relative movement between the interconnected vehicle components and upon the fixed, or sometimes manually adjustable, fluid flow characteristics of the dampers. A serious deficiency of a damper of the aforesaid type is that it will at times amplify, rather than attenuate, motion of the vehicle frame. This highly undesirable result will occur whenever the vehicle frame and axle components are moving in the same direction (e.g, upwardly or downwardly) and the absolute velocity of the axle component is greater than that of the frame component.

In contrast to a passive hydraulic damper, an active hydraulic actuator connected by suitable control means to a hydraulic pump or similar source of high pressure hydraulic fluid can and does produce output forces totally independent of relative movements between the masses interconnected by the actuator. When associated with suitable means for rapidly and appropriately controlling the flow of pressurized hydraulic fluid to it, a fast-acting hydraulic actuator can therefore produce optimal motion attenuation of one of the masses in substantially all situations. However, the size, weight and/or expense of a hydraulic pump or the like and the necessary associated control components makes the use of an active actuator impractical in the vehicle suspensions of some vehicles (e.g., motorcycles) and renders the use thereof unattractive in many other types of vehicles.

An alternative to a motion-attenuation system employing an active actuator, and also to a system employing an uncontrolled passive damper, is a "semi-active" system along the lines of that disclosed in U.S. Pat. No. 3,807,678. The system of such patent does not employ an active actuator, and therefore does not need or include a hydraulic pump or similar source of high pressure fluid, but achieves a degree of motion attenuation closely approaching that realizable by a fully active system. This desirable result is achieved by control of the output of a purely passive damper so as to cause, among other things, such output to be of substantially zero magnitude at all times when motion amplification rather than motion attenuation would ensue from a damper output of any appreciable magnitude.

While affording many benefits, a semi-active damper control system intended for general vehicle-suspension use must satisfy a variety of diverse requirements if it is to be commercially acceptable. It must be exceedingly rapidly acting and relatively inexpensive. It should be readily adaptable to and mountable in association with the existing suspension and frame components of different types of vehicles. This necessitates, among other things, that the system components be of lightweight compact construction and that they not be orientation-dependent; i.e., the operation thereof should not be adversely affected by the particular orientation in which they are mounted or by subsequent changes in such orientation due to movement of the vehicle structure to which they were secured. The system components should be highly reliable in operation and therefore should be well-protected against damage from the harsh environmental conditions (exposure to dirt, grime, water, snow, ice, impacts from rocks and the like, extreme changes in temperature, etc.) to which vehicle suspensions are customarily subjected. At the same time, however, the system component should be readily accessible for purposes of adjustment, inspection and/or repair if required.

DESCRIPTION OF THE PRIOR ART

In addition to U.S. Pat. No. 3,807,678, the following other U.S. patents may be deemed relevant to the present invention.

U.S. Pat. No. 4,061,320 discloses a vehicle suspension system including a passive hydraulic damper of the "uniflow" or "double cylinder" type and an associated fluid accumulator. The system does not include any means for either adjusting or dynamically controlling the damper output.

U.S. Pat. No. 2,048,037 discloses a passive hydraulic damper having a manually adjustable flow controller associated therewith.

U.S. Pat. No. 3,850,196 discloses a fluid control valve whose operating member is spring-biased to one position and is moveable to another position by an electrical actuator having static magnetic components similar to those employed in a voice coil device.

U.S. Pat. No. 4,338,968 discloses an oil accumulator having a spring biased poppet valve and an associated solenoid assembly which assists in maintaining the valve in an open condition at desired times.

Other patents relating to fluid control valves and having electrical actuators of possible interest are U.S. Pat. Nos. 4,346,736, 4,345,737, 4,307,752, 4,294,286, 4,216,938, 4,193,431, 3,861,644, and 2,920,651.

SUMMARY OF THE INVENTION

The present invention provides a compact, reliable, durable, and relatively inexpensive suspension system, capable of convenient installation and use in association with a variety of different types of vehicles, having a passive hydraulic damper assembly and associated control means for monitoring the dynamic characteristics of the vehicle frame and axle components interconnected by the damper and for causing the damper's output to be of minimal magnitude at those times when it would amplify rather than attenuate motion of the frame component of the vehicle.

In a preferred embodiment thereof, the system includes a fluid accumulator and associated fluid circuitry for conducting hydraulic fluid unidirectionally along a close-loop path of travel between the damper assembly and the accumulator during operation of the damper. In addition to performing a conventional variable-volume "reservoir" function, the accumulator is utilized to support and protect at least one and preferably all valve devices of the system. The latter include a command responsive valve which is generally of the voice-coil type having a coil supporting bobbin which is slidable longitudinally of a shaft-like magnetic member closely encircled by another annular magnetic member of opposite polarity and defining therewith an annular gap, traversed by a permanent magnetic field, into which the coil supporting portion of the bobbin projects. The shaft-like magnetic member is provided with a central blind passageway which receives fluid conducted from the damper assembly during and by reason of the latter's operation, and further includes a plurality of fluid outlet openings communicating with and extending radially outwardly from such passageway. In first and second different positions thereof, the bobbin slidable longitudinally of the shaft-like member respectively permits a maximum flow and a reduced flow of hydraulic fluid from the blind passageway through the outlet openings of such member. Movement of the bobbin between its two positions occurs in response to command signals transmitted to its encircling coil by an electronic controller which continuously receives input data from motion detectors associated with the vehicle components interconnected by the damper assembly. At those times when the vehicle component movements are such that damper output would amplify motion of the vehicle frame, the controller causes the bobbin to occupy its first position and to thus minimize such output.

The aforesaid valve of the voice coil type is so designed and constructed as to insure very rapid movement of the bobbin between its two positions. Other valve means of the system permit adjustment of the minimum damper output, and provide protection against excessive fluid pressures.

DESCRIPTION OF THE DRAWINGS

Still other features of the invention will be apparent from the following description of an illustrative embodiment thereof, which should be read in conjunction with the accompanying drawings, in which.

DESCRIPTION OF THE PREFERRED EMBODIMENT

Figure 1:
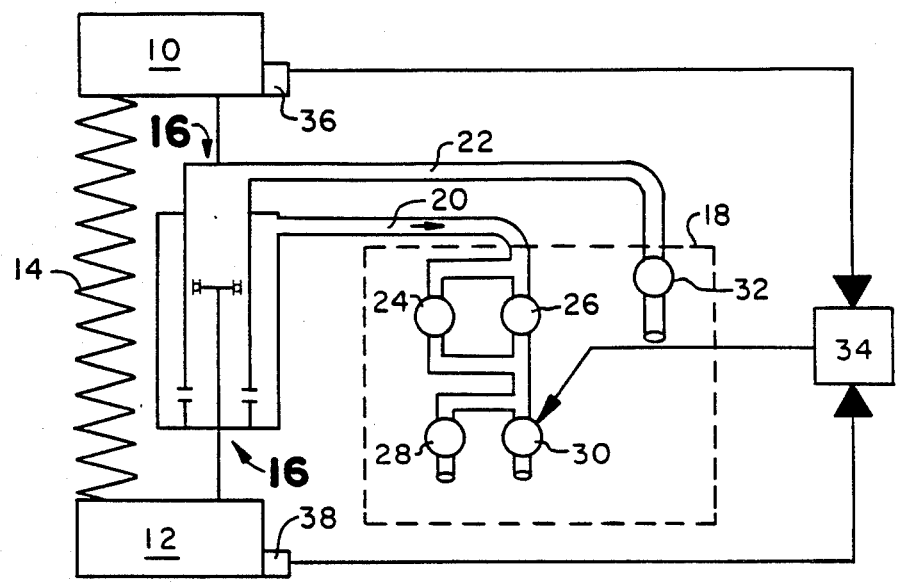
FIG. 1 is a schematic representation of a vehicle suspension system in accordance with the invention.

In FIG. 1 of the drawings, the numerals 10, 12 respectively designate vehicle frame and axle components supportively connected by passive spring means 14 and further interconnected by a passive hydraulic damper assembly 16 which extends in parallel relationship to spring 14 and undergoes axial retraction and extension in response to movement of vehicle components 10, 12 toward and away from each other. During both modes of operation of damper 16, which is of the "uniflow" or "double cylinder" type, hydraulic fluid passes from it to a fluid accumulator 18 via a conduit 20. During extensions of damper 16 fluid is passively returned from the accumulator to the damper via another conduit 22. A plurality of valve devices 24, 26, 28, 30 and 32 are associated with accumulator 18. Valve 32 is a check valve disposed in series with conduit 22 and permitting fluid flow through it only from accumulator 18 to damper 16. Valves 26, 30 are arranged in series relationship with each other and with conduit 20. Valve 30 is of a command-signal responsive type having a flow controlling component effective in a first position thereof to permit a maximum flow of fluid from damper 16 into accumulator 18 and in a second position thereof to restrict such fluid flow. Valve 26, which is disposed "upstream" of valve 30, is a manually adjustable throttle valve. It restricts the flow of fluid through conduit 20 and to accumulator 18 to a desired minimal extent when the flow controlling component of valve 30 occupies its aforesaid first position. Valves 24, 28 are normally closed and pressure responsive "safety" valves respectively disposed in parallel relationship with valves 26, 30. If the fluid pressure at valve 26 or 30 should reach an excessive magnitude, fluid is bypassed about it by then ensuing opening of the valve 24, 28 in parallel therewith.

During operation of the FIG. 1 system, valve 30 continuously receives command signals from an electronic controller 34 which continuously receives input data indicative of the instantaneous dynamic conditions of vehicle components 10, 12 from suitable sensors 36, 38 associated therewith. The command signals directed from controller 34 to valve 30 cause the latter's flow controlling component to occupy its second, flow-impeding position except at those times when vehicle frame and axle components 10, 12 are moving in the same direction (e.g., either upwardly or downwardly in the FIG. 1 orientation thereof) and the absolute velocity of vehicle frame 10 is less than the absolute velocity of vehicle axle 12. At the aforesaid times, during which the output of a conventional uncontrolled damper would amplify rather than attenuate motion of vehicle frame 10, valve 30 is caused by a command signal from controller 34 to permit a maximum flow of fluid from damper 16 into accumulator 18 and to thereby effectively reduce the output of the damper to a minimal value determined by the adjusted setting of manually adjustable valve 26. Some minimal restriction by valve 26 of the fluid flow from damper 16 to accumulator 18 has been found desirable, even when the condition of valve 30 is such as to allow maximum flow, to prevent substantially undamped "wheel hop" movement of vehicle axle component 12 which might otherwise possibly then occur. The small flow-restricting effect of valve 26 is insufficient to significantly detract from the improved vehicle stability, comfort and safety realized by valve 30 reducing the damper output to a minimal magnitude at those times when the normal damper output would amplify rather than attenuate motion of vehicle frame 10.

Figure 2:
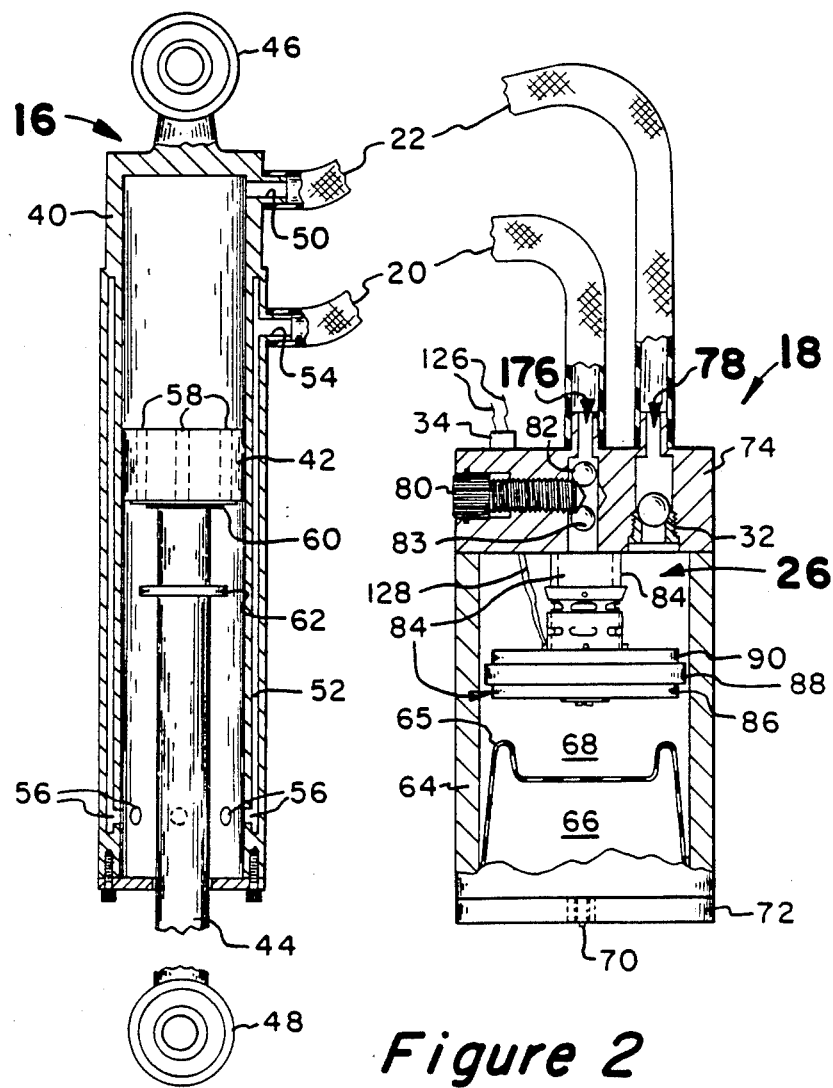
FIG. 2 is a partially elevational but primarily sectional view of a damper assembly, accumulator unit and fluid-conducting associated conduits and valve members of the system.

Referring now also to FIG. 2 of the drawings, damper assembly 16 includes a cylinder 40, piston 42 and rod 44. A suitable bushing-containing connector 46 is provided at the upper end of cylinder 40 for direct or indirect connection to vehicle frame 10 and a similar connector 48 is provided at the lower end of rod 44 for direct or indirect connection to vehicle axle component 12. A port 50 adjacent the upper end of cylinder 40 establishes communication between the interior of the cylinder and fluid return conduit 22. An annular chamber 52 provided within the cylindrical wall of cylinder 40 communicates via a port 54 with fluid conduit 20, and communicates adjacent the lower end of the cylinder with the interior thereof via a plurality of radially-extending and circumferentially spaced ports 56. Piston 42 has a plurality of ports 58 extending vertically therethrough, in equally spaced relationship to each other about the piston's central axis, which are underlaid at the piston's undersurface by the flexible peripheral portion of an annular check-valve member 60 carried by and extending in encircling relationship to rod 44. Member 60 permits free fluid flow through piston ports 58 during retraction of damper 16 while preventing fluid flow through such ports during extension of damper 16. A bumper or stop member 62 provided upon rod 44 performs dual functions during extreme extension of device 16. It firstly prevents possibly damaging engagement of member 60 with the lower end of cylinder 40, and secondly prevents piston 42 from ever being displaced relative to cylinder 40 to a location wherein it would block ports 56.

Damper 16 is at all times completely filled with hydraulic fluid. During damper retraction, fluid within the portion of cylinder 40 above piston 50 passes through piston ports 58 into the cylinder portion beneath the piston, thence through ports 56 into chamber 52, and then through port 54 into the conduit 20 extending to accumulator 18. During extension of damper 16, fluid within that portion of cylinder 40 beneath piston 58 similarly passes through ports 56, chamber 52, port 54 and conduit 20 to accumulator 18, while at the same time the fluid-filled condition of the cylinder portion above piston 42 is maintained by fluid supplied thereto through port 50 and conduit 22 from accumulator 18. Ports 50, 54, 56, 58 and damper auxiliary chamber 52 are all of such a size as to not significantly restrict the flow of fluid therethrough, and none of them are intended or adapted to function as a flow restricter.

As is also shown in FIG. 2, the accumulator unit 18 includes a rigid and generally cylindrical sealed casing or housing 64 having removable closures 72, 74 at its opposite ends. The interior of housing 64 is divided by a flexible diaphragm 65 into two variable volume chambers 66, 68. Chamber 66 contains pressurized gas which is introduced therein through a suitable fitting 70 provided in association with the lower end closure 72 of housing 64. The larger closure member 74 at the opposite upper end of housing 64 has vertical ports 176, 78 extending completely therethrough and communicating at their upper ends with conduits 20, 22, respectively. Port 78 contains the previously noted check valve 32 which permits fluid flow through conduit 22 from accumulator 18, and more specifically from the fluid-filled upper chamber 68 of accumulator housing 64, while prohibiting reverse flow of fluid from conduit 22 into chamber 68. Manually adjustable valve 26 and pressure relief valve 24 (FIG. 1) are both carried by and housed within end closure 74 in association with port 76. More specifically, valve 26 includes an adjustment screw 80 housed within a threaded bore extending laterally of and into port 76 intermediate the length thereof. Rotation of the outer end of screw 80 displaces the inner end thereof to a greater or lesser extent transversely of port 76, and thus imposes a desired minimal restriction upon the flow of fluid through the port. Pressure relief valve 24 includes a spring-biased ball member 82 seated within and normally blocking the entrance opening of a generally U-shaped bypass passageway 83 communicating at its opposite ends with port 76 at elevations above and below that of screw 80. Command responsive control valve 30 is fixedly but releasably connected to the undersurface of closure 74 and projects downwardly therefrom in axial alignment with closure port 76. The valve is totally enclosed by the rigid housing and end closures of accumulator 18 and is also totally immersed within the fluid filling accumulator chamber 68.

Referring also to FIGS. 3-6 of the drawings, valve 30 includes an elongate shaft-like magnetic member 84 encircled by an annular permanent magnet 88 having a pole face affixed to and overlying an end flange 86 of member 84. The opposite pole face of magnet 88 is overlaid by an annular magnetic member 90 extending in radially spaced encircling relationship to member 84 and defining therewith an annular gap 92 traversed at all times by a high-intensity magnetic flux field. A blind central passageway 94 opens from the end of magnetic member 84 distal from flange 86 and is provided with internal screw threads 96 (FIG. 4) along an initial portion of its length. Threads 96 mate with those of an externally threaded annular boss 98 (FIG. 5) projecting downwardly from accumulator closure 74 in axial alignment with closure port 76, such that valve 30 is securely but releasably connected to closure 74 for reception within its passageway 94 of fluid passing through closure port 76. First and second sets of radial fluid outlet openings 100, 100' are provided within the section of member 84 containing passageway 94 for free radial discharge, at desired times, of fluid from such passageway into accumulator chamber 68. Openings 100, 100' are of elongated slot-like shape and those of each set are spaced equally from each other about the circumference of member 84 and have their major axes lying within a common plane perpendicular to the central axis of member 84 and passageway 94. Illustratively four openings 100, 100' are provided in each set thereof, and each opening spans approximately forty-five degrees of the circumference of member 84.

Valve 30 further includes a thin-walled cylindrical slider or bobbin 102, formed of lightweight and non-magnetizable aluminum or comparable material, having a coil 104 would upon one end portion thereof. A set of slot-like openings 106 extending through another portion of bobbin 102 correspond in shape, size and relative spacing to outlet openings 100 of magnetic member 84. Bobbin 102 encircles and is slidably moveable longitudinally of magnetic member 84 between a first position, shown in FIG. 5, and a second position wherein the end thereof distal from coil 104 abuts the narrow end face of a tapered stop collar 108 encircling and adjustably secured to member 84 as by a set-screw 110. When bobbin 102 occupies its first (FIG. 5) position axially of member 84, fluid can pass freely from the passageway 94 within such member through openings 100, 100' thereof since bobbin openings 106 are then radially aligned with openings 100 of member 84 and the bobbin does not overlie openings 100'. When bobbin 102 occupies its second position, wherein the end thereof distal from coil 104 abuts stop collar 108, both sets of openings 100, 100' of member 84 are overlaid by solid portions of the bobbin. Bobbin 102 then restricts fluid flow from passageway 94 through openings 100, 100' of member 84, and thus from damper 16 into accumulator chamber 68, since the fluid must then pass between confronting portions of the respective outer and inner cylindrical surfaces of member 84 and bobbin 102. The degree of flow restriction present whenever bobbin 102 occupies its second position is proportional to the preselected desired difference between the dimensions of the outer diameter of member 84 and the inner diameter of the bobbin 102 associated therewith, and may be changed if and as desired by substitution of bobbins of differing inner diameters.

Figure 4:
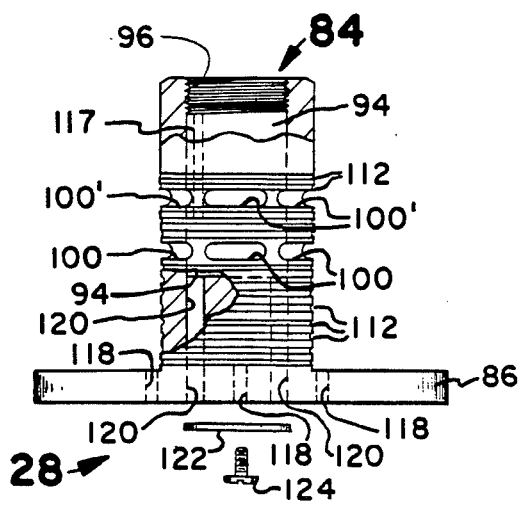
FIG. 4 is an exploded and partially broken-away elevational view of a shaft-like magnetic member of the command responsive valve, and of an associated pressure relief valve.
Figure 3:
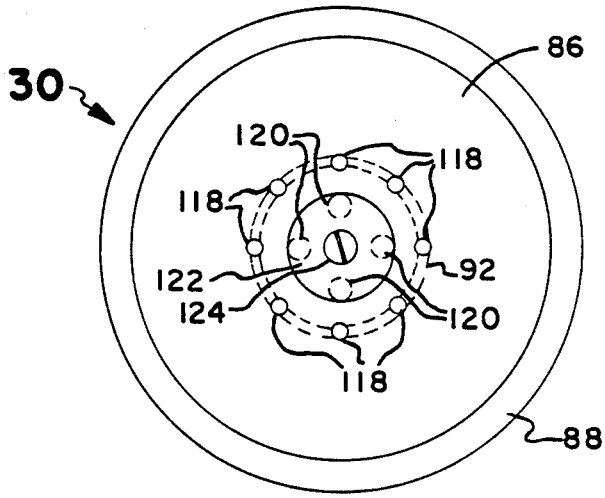
FIG. 3 is an enlarged bottom plan view of the command responsive control valve shown in FIG. 2 within the accumulator.

Bobbin 102 must and does possess the capability for exceedingly rapid movement between its first and second positions. This capability is enhanced by the presence of fluid between the confronting cylindrical surfaces of bobbin 102 and member 84, and also by the presence upon the latter of shallow circumferential grooves 112 (FIG. 4). Grooves 112 further reduce the coefficient of friction between the confronting cylindrical surfaces of member 84 and bobbin 102, and additionally tend to further circumferentially equalize fluid pressures imposed upon the inner surface of the bobbin when in its second position.

A plurality of small lug-like elements 114 are spaced equally from each other about the outer circumference of bobbin 102 adjacent the coil 104 thereon, and a single similar element 116 projects a short distance radially inwardly from the inner surface of that end portion of the bobbin distal from the coil. Elements 114 constitute stop means which halt movement of bobbin 102 from its second position to its first position by abutting engagement, upon arrival of the bobbin at its first position, with annular magnetic member 90. Element 116 is received within a shallow groove 117 (FIG. 4) provided within and extending longitudinally of an underlying portion of the outer periphery of member 84. The cooperating element 116 and groove 117 permit free sliding movement of bobbin 102 between its first and second positions but preclude rotative movement of the bobbin about member 84. Maintenance of the bobbin in its illustrated rotative orientation insures that openings 106 will always align radially with openings 100 of member 84 when the bobbin occupies its first position.

Figure 5:
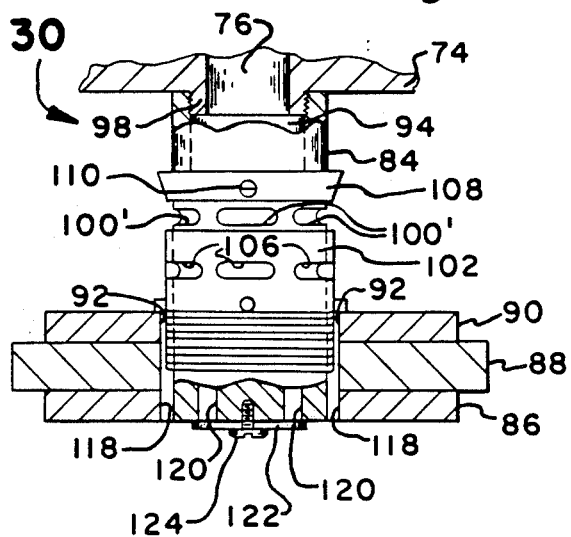
FIG. 5 is a view partially in elevation and partially in section of the command responsive valve and an adjacent portion of the upper closure member of the accumulator.
Figure 6:
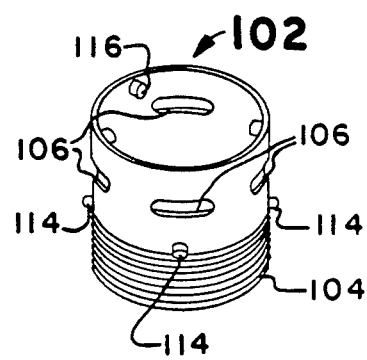
FIG. 6 is a perspective view of the bobbin component of the command responsive valve shown in FIGS. 2 and 5.

As is most readily apparent from FIG. 5, approximately one-half of the windings of bobbin coil 104 are disposed within the annular gap defined between magnetic members 84, 90 whenever bobbin 102 occupies its illustrated first position. Interaction between the gap's high intensity magnetic field and coil 104 therefore rapidly displaces bobbin 102 from its first and to its second position when an electrical command signal of appropriate plus or minus voltage is applied to the coil. As bobbin 102 approaches stop collar 108, the latter's tapered configuration permits free displacement of fluid outwardly from the path of movement of the bobbin. Upon arrival of bobbin 102 at its second position, the same is maintained thereat by the continued application to coil 104 of the same command signal, or one of the same sign but of reduced magnitude. The application to coil 104 of another command signal of opposite voltage similarly rapidly returns bobbin 102 from its second position to its first position, and maintains the bobbin in its first position for as long as the signal, or one of the same voltage but reduced magnitude, is maintained within the coil. To prevent the fluid within gap 92 from possibly retarding movement of bobbin 102 to its first position, a plurality of bore-like parts 118 are provided through end flange 86 of magnetic member 84. Ports 118 are spaced equally from each other about the central axis of magnetic member 84 and are each aligned with the annular gap 92 between members 84, 90. Fluid displaced from gap 92 by bobbin 102 and/or coil the 104 thereon can therefore escape freely from the gap through ports 118, as well as through the gap "entrance" opening facing the opposite end of member 84, so as to not in any way impede movement of bobbin 102.

The pressure relief valve 28 shown in FIG. 1 in parallel with control valve 30 includes a resilient disk-like member 122 secured by a fastener 124 upon and centrally of the outer face of end flange 86 of member 84. The periphery of member 122 overlies the "exit" or lower ends of a set of ports 120 spaced equally from each other about the central axis of member 84 and extending in parallel relationship therewith to the blind central passageway 94 of member 84. If the fluid pressure within passageway 96 should become excessive, flexure of the periphery of disk 122 and resulting escape of fluid from the passageway through ports 120 would occur so as to protect bobbin 102 from deformation or other damage by the excessive pressure.

As is indicated in FIG. 2, the electronic controller 34 preferably is also carried by and housed at least partially within upper closure 74 of accumulator 18. Input data from the motion detectors 36, 38 (FIG. 1) associated with vehicle frame and axle components 10, 12 is conducted to controller 34 by electrical leads 126, and command signals are conducted from the controller to bobbin coil 104 by leads 128. The command signals maintain bobbin 102 in its second position, wherein the bobbin significantly restricts flow of hydraulic fluid from damper 16 into accumulator chamber 68 and thus then allows the damper to operate in a manner similar to a conventional uncontrolled one, except at those times when the vehicle frame and axle components 10, 12 are moving in the same direction and the velocity of axle 12 is greater than of frame 10. At the latter times, the commanded movement of bobbin 102 to its first position prevents damper 16 from amplifying the motion of vehicle frame 10, as would occur if the damper were of an uncontrolled type.

As previously noted, a number of factors contribute to the necessary rapid speed of operation or short response time of valve 30. The shapes and locations of the fluid outlet openings of magnetic member 84 and bobbin 102 are such as to minimize the length of the travel or stroke of movement of the bobbin. The bobbin itself is of extremely lightweight and streamlined construction and no springs or similar biasing elements are associated with it. A low coefficient of friction and an equalized pressure condition exists between the confronting surfaces of the bobbin and magnetic member 84. Fluid is not trapped adjacent the "leading" end of the bobbin during movement thereof in either direction. The magnetic field permanently maintained within the gap 92 between magnetic member 84, 90 is of high intensity, due in significant part to the portion of member 84 encircled by such gap being of essentially solid construction, and approximately one-half of the windings of coil 104 are disposed within such gap in either position of the bobbin. Overheating of the coil does not occur since the command signals applied to it are of small magnitude and the coil is continuously cooled by the hydraulic fluid within which the entire valve 30 is completely immersed. It will also be noted that all valve components are well-protected from harsh environmental conditions and accidental impacts or the like, but are readily accessible for purposes of adjustment, inspection or repair when required.

While a preferred embodiment of the invention has been specifically shown and described, this was for purposes of illustration only, and not for purposes of limitation, the scope of the invention made in accordance with the following claims.

We claim:

1. In a vehicle suspension system of the type including an extensible and retractable passive hydraulic damper assembly interconnecting relatively moveable vehicle components and adapted to passively attenuate motion of at least one of said components, and further including a fluid accumulator connected to said damper assembly and adapted during operation thereof to receive hydraulic fluid from and to passively supply hydraulic fluid to said assembly, the improvement comprising:

signal responsive control valve means for controlling the flow of fluid from said damper assembly to said accumulator; said control valve means including an elongate shaft-like magnetic member having a central blind passageway extending along part of the length and opening from one end thereof for receiving fluid passing from said damper assembly to said accumulator; said shaft-like member having a set of slot-like fluid outlet openings extending generally radially outwardly from said fluid passageway through the outer circumference of said member, said openings being spaced substantially equally from one another about the circumference of said member with the major axes thereof lying within a common plane perpendicular to the central axis of said member;

an annular magnetic member encircling said first-mentioned magnetic member at a location spaced longitudinally from the section thereof having said passageway therewithin, said magnetic members being of opposite magnetic polarities and defining therebetween a narrow annular gap traversed by magnetic flux;

a tubular bobbin formed of lightweight nonmagnetic material, said bobbin encircling and being freely slidable longitudinally of said first magnetic member between first and second positions spaced along the length of said first member by a distance only slightly greater than the width of said slot-like outlet openings therein, said bobbin in said first position thereof permitting maximum flow of fluid from said outlet openings of said member and in said second position thereof retarding flow of fluid from said outlet openings;

coil means carried by and encircling an end portion of said bobbin closely received within said annular gap between said magnetic members in both of said positions of said bobbin, said bobbin being rapidly moved to and maintained in said first position thereof by the application to said coil of a first electrical command signal and being rapidly moved to and maintained in said second position thereof upon the application of said coil means of an opposite sign second command signal;

and electronic control means for monitoring movement characteristics of said vehicle components and for applying command voltage signals to said coil means continuously during operation of said system, said control means applying said first command signal to said coil means at those times when said damper would tend to amplify motion of said one of said vehicle components and at other times applying said second command signal to said coil means.

2. A system as in claim 1, wherein said control valve means is carried by and protectively disposed entirely within said accumulator.

3. A system as in claim 1, wherein the exterior peripheral surface portion of said shaft-like member along which said bobbin is slidably moveable has shallow grooves therein facilitating the freedom of said movement of said bobbin between said positions thereof.

4. A system as in claim 1, wherein said bobbin has a set of radial fluid outlet openings correlated in size, shape and circumferential spacing to said fluid outlet openings of said shaft-like magnetic member, said outlet openings of said bobbin being radially aligned with said outlet openings of said shaft-like magnetic member when said bobbin occupies said first position thereof, and being nonaligned with said outlet openings of said shaft-like magnetic member when said bobbin occupies said second position thereof.

5. A system as in claim 1, and further including cooperating complementary means respectively associated with said bobbin and said shaft-like magnetic member for preventing rotative movement of said bobbin about said magnetic member.

6. A system as in claim 5, wherein said complementary means includes a stud-like element upon said bobbin, and said shaft-like member has a groove extending longitudinally thereof and receiving said element.

7. A system as in claim 1, wherein said valve means further includes stop means for arresting movement of said bobbin upon its arrival at either of said positions thereof.

8. A system as in claim 7, wherein said stop means includes a plurality of lug-like elements spaced substantially equally from each other about the exterior surface of said bobbin intermediate the length thereof, said lug-like elements being engageable with said annular magnetic member upon arrival of said bobbin at one of said positions thereof.

9. A system as in claim 7, wherein said stop means includes at least one stop element carried by and projecting outwardly from said bobbin intermediate the length thereof, said stop element being engageable with said annular magnetic member upon arrival of said bobbin at said first position thereof.

10. A system as in claim 7, wherein said stop means further includes a tapered collar-like member encircling said shaft-like magnetic member and engageable by an end of bobbin upon arrival thereof at said second position.

11. A system as in claim 1, wherein approximately one-half of the total windings of said coil upon said bobbin are disposed within the magnetic flux field traversing said annular gap in each of said positions of said bobbin.

12. A system as in claim 1, wherein said shaft-like magnetic member of said valve means has, in addition to said first-mentioned set of fluid outlet openings, a second set thereof spaced longitudinally of said shaft-like magnetic member from said first set, said bobbin when in said first position thereof permitting maximum flow of fluid from both of said sets of fluid outlet openings of said shaft-like magnetic member and when in said second position thereof impeding the flow of fluid from both of said sets of fluid outlet openings.

13. A system as in claim 1, wherein said valve means is disposed interiorly of said accumulator and is immersed with hydraulic fluid contained therein, said shaft-like magnetic member of said valve means including an end flange having a plurality of ports therein for conducting through said flange fluid displaced from said annular gap by movement of said bobbin.

14. A system as in claim 13, wherein said shaft-like magnetic member has a plurality of bores extending longitudinally thereof between the terminus of said blind passageway and the other end of said shaft-like member, and further including a pressure-responsive valve member adjacent said other end of said member for permitting egress of fluid from said passageway through said bores when the pressure of said fluid is of a predetermined magnitude.

15. A system as in claim 13, and further including adjustable throttle valve means carried by said accumulator in upstream series relationship to said control valve means for restricting to an adjustably variable minimal extent the flow of hydraulic fluid from said damper assembly to said accumulator at those times when said bobbin occupies said first position thereof.

16. A system as in claim 15, and further including pressure-responsive by-pass valve means carried by said accumulator in parallel with said throttle valve for by-passing fluid about said throttle valve when the fluiid pressure thereat exceeds a predetermined magnitude.

17. A system as in claim 16, wherein said accumulator comprises a housing having closure members at opposite ends thereof, a flexible diaphragm disposed within said housing and dividing the same into a first chamber contacting said hydraulic fluid and a second chamber containing a pressurized gas, said control valve means and throttle valve means and said pressure-responsive valve means being carried by the one of said end closures adjacent said first chamber of said accumulator, and further including check valve means carried by said one of said end closures for permitting unidirectional return flow of fluid from said fluid chamber to said damper assembly.

* * * * *